United States Patent
Kim

(10) Patent No.: US 9,956,953 B2
(45) Date of Patent: May 1, 2018

(54) APPARATUS AND METHOD FOR CONTROLLING ENGINE OF HYBRID VEHICLE

(71) Applicant: HYUNDAI MOTOR COMPANY, Seoul (KR)

(72) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 14/958,009

(22) Filed: Dec. 3, 2015

(65) Prior Publication Data
US 2017/0001623 A1    Jan. 5, 2017

(30) Foreign Application Priority Data
Jun. 30, 2015  (KR) .................. 10-2015-0092815

(51) Int. Cl.
*B60W 20/13*  (2016.01)
*F02D 29/02*  (2006.01)
(Continued)

(52) U.S. Cl.
CPC ............ *B60W 20/13* (2016.01); *B60K 6/387* (2013.01); *B60K 6/442* (2013.01); *B60K 6/48* (2013.01);
(Continued)

(58) Field of Classification Search
CPC . B60K 6/48; B60K 6/20; B60K 6/387; B60K 6/442; B60K 6/547; B60K 6/22; B60K 6/365; B60K 6/40; B60W 10/08; B60W 10/06; B60W 20/00; B60W 10/02; B60W 10/30; B60W 20/40; Y02T 10/6221; Y02T 10/6286; Y02T 10/7077; B60Y 2200/92; Y10S 903/902; Y10S 903/903; Y10S 903/904; Y10S 903/914; Y10S 903/951; Y10T 477/26; Y10T 477/23; B60L 11/14; F16D 48/06; F16H 61/0031; F03D 7/048
(Continued)

(56) References Cited

U.S. PATENT DOCUMENTS

2001/0004027 A1*  6/2001  Masaki .................. B60K 6/387
                                                              180/65.23
2005/0215366 A1*  9/2005  Serkh ...................... F02B 67/06
                                                              474/74
(Continued)

FOREIGN PATENT DOCUMENTS

JP         11-082098        3/1999
JP         2007-168495 A    7/2007
(Continued)

*Primary Examiner* — Anne M Antonucci
*Assistant Examiner* — Sanjeev Malhotra
(74) *Attorney, Agent, or Firm* — McDermott Will & Emery LLP

(57) ABSTRACT

A method of controlling an engine of a hybrid vehicle includes steps of calculating a maximum torque of an engine at which an engine lambda=1 is maintained; calculating a maximum dischargeable torque of a driving motor; and allowing an operation of the engine having the engine lambda<1 when a torque required by a driver is greater than a sum of the maximum torque of the engine at which the engine lambda=1 is maintained and the maximum dischargeable torque of the driving motor.

6 Claims, 2 Drawing Sheets

(51) Int. Cl.

| | | |
|---|---|---|
| *B60L 11/18* | (2006.01) | |
| *B60W 10/06* | (2006.01) | |
| *B60W 10/08* | (2006.01) | |
| *B60K 6/387* | (2007.10) | |
| *B60K 6/442* | (2007.10) | |
| *B60K 6/48* | (2007.10) | |
| *B60K 6/485* | (2007.10) | |
| *B60K 6/547* | (2007.10) | |
| *B60W 20/10* | (2016.01) | |
| *B60W 20/16* | (2016.01) | |
| *B60W 20/00* | (2016.01) | |

(52) U.S. Cl.
CPC .............. *B60K 6/485* (2013.01); *B60K 6/547* (2013.01); *B60L 11/1861* (2013.01); *B60W 10/06* (2013.01); *B60W 10/08* (2013.01); *B60W 20/10* (2013.01); *B60W 20/16* (2016.01); *F02D 29/02* (2013.01); *B60K 2006/4825* (2013.01); *B60W 20/00* (2013.01); *B60W 2510/0657* (2013.01); *B60W 2510/244* (2013.01); *B60W 2540/10* (2013.01); *B60W 2710/0622* (2013.01); *B60W 2710/0666* (2013.01); *B60W 2710/083* (2013.01); *Y10S 903/906* (2013.01); *Y10S 903/946* (2013.01)

(58) Field of Classification Search
USPC ....... 701/22, 102, 103, 104; 180/65.23, 243; 123/557; 474/74; 475/5; 477/3, 5; 192/31; 137/565.11, 565.16; 417/420
See application file for complete search history.

(56) References Cited

U.S. PATENT DOCUMENTS

| | | | | | |
|---|---|---|---|---|---|
| 2005/0279334 | A1* | 12/2005 | Lerner | .................... | F02M 31/10 123/557 |
| 2006/0011394 | A1* | 1/2006 | Colvin | .................... | B60K 6/365 180/65.23 |
| 2006/0276289 | A1* | 12/2006 | Hirata | .................... | B60K 6/365 475/5 |
| 2007/0087894 | A1* | 4/2007 | Tsuneyoshi | ............ | B60K 6/445 477/3 |
| 2007/0135257 | A1* | 6/2007 | Bissontz | .................... | B60K 6/48 477/5 |
| 2008/0196989 | A1* | 8/2008 | Petzold | .................... | F16D 48/04 192/31 |
| 2011/0125353 | A1* | 5/2011 | Komeda | ................ | B60K 6/387 701/22 |
| 2012/0083948 | A1* | 4/2012 | Tate, Jr. | .............. | B60L 11/1861 701/22 |
| 2012/0142488 | A1* | 6/2012 | Kim | ........................ | B60K 6/445 477/3 |
| 2013/0213501 | A1* | 8/2013 | Long | ........................ | B60K 6/48 137/565.11 |
| 2013/0325227 | A1* | 12/2013 | Whitney | ............... | B60W 10/06 701/22 |
| 2014/0080664 | A1* | 3/2014 | Hartz | ........................ | B60K 6/40 477/5 |
| 2014/0121871 | A1* | 5/2014 | Kim | ........................ | B60K 6/442 701/22 |
| 2014/0244083 | A1* | 8/2014 | Kim | ........................ | B60W 20/00 701/22 |
| 2014/0340023 | A1* | 11/2014 | Shu | ........................ | H02J 7/0018 320/107 |
| 2015/0008887 | A1* | 1/2015 | Kim | ..................... | H01M 10/443 320/136 |
| 2015/0025775 | A1* | 1/2015 | Green | ..................... | F02D 41/30 701/103 |
| 2015/0084597 | A1* | 3/2015 | Kim | ..................... | B60L 11/1875 320/127 |
| 2015/0112536 | A1* | 4/2015 | Severinsky | ............ | B60H 1/004 701/22 |
| 2015/0132163 | A1* | 5/2015 | Wright | .................... | B60K 6/547 417/420 |
| 2015/0180257 | A1* | 6/2015 | Snyder | ................ | H01M 10/441 320/103 |
| 2015/0197145 | A1* | 7/2015 | Kochidomari | ....... | B60K 7/0007 180/243 |
| 2015/0203100 | A1* | 7/2015 | Whitney | ................ | B60W 10/06 701/22 |
| 2016/0033031 | A1* | 2/2016 | Long | ........................ | B60K 6/48 137/565.16 |
| 2016/0047329 | A1* | 2/2016 | Klingbeil | ............. | F02D 19/061 701/104 |
| 2016/0177813 | A1* | 6/2016 | Styles | ................. | F02B 29/0468 701/102 |
| 2016/0244053 | A1* | 8/2016 | Hartz | ........................ | B60K 6/40 |
| 2016/0352102 | A1* | 12/2016 | Zhao | ........................ | F03D 7/048 |

FOREIGN PATENT DOCUMENTS

| | | |
|---|---|---|
| JP | 2009-227074 A | 10/2009 |
| JP | 2009-255767 A | 11/2009 |
| JP | 2012-006575 A | 1/2012 |
| JP | 2014-031782 A | 2/2014 |
| KR | 10-1209731 B1 | 12/2012 |
| KR | 10-2014-0027397 A | 3/2014 |

* cited by examiner

APPARATUS AND METHOD FOR CONTROLLING ENGINE OF HYBRID VEHICLE

CROSS-REFERENCE TO RELATED APPLICATION

This application claims under 35 U.S.C. § 119(a) the benefit of priority to Korean Patent Application No. 10-2015-0092815, filed on Jun. 30, 2015, the entire content of which is incorporated herein by reference.

TECHNICAL FIELD

The present disclosure relates to an apparatus and a method for controlling an engine of a hybrid vehicle. More particularly, it relates to an apparatus and a method for controlling an engine of a hybrid vehicle, which are capable of providing a torque required by a driver and charging a battery by varying an engine lambda according to the torque required by the driver.

BACKGROUND

A power train system for a hybrid vehicle includes, as illustrated in FIG. 1, an engine 10 and a motor 12 serially arranged with each other. An engine clutch 13 is arranged between the engine 10 and the motor 12 to transmit or block power from the engine. An automatic transmission 14 is provided for shifting and outputting power from the motor and the engine to the wheels. A hybrid starter generator (HSG) 16, which is a kind of motor, is connected with a crank pulley of the engine so that power is transmittable to generate power for starting the engine and charging the battery. An inverter 18 is provided for controlling the motor and controlling power generation, and a high voltage battery 20 is connected with the inverter so as to be chargeable/dischargeable, so that power is provided to the motor 12 and the like.

The power train system for the hybrid vehicle is a type in which the motor is attached to the automatic transmission, and is called a transmission mounted electric device (TMED) scheme. It provides travelling modes including an electric vehicle (EV) mode that is a pure electric vehicle mode using only the power of the motor, a hybrid electric vehicle (HEV) mode using the power of the engine as the main power and the power of the motor as auxiliary power, and a regenerative braking (RB) mode, in which the motor collects braking and inertia energy of the vehicle through power generation and charges the battery while the vehicle brakes or travels by inertia.

In a hybrid vehicle using electric power from both the engine and the driving motor, the engine is generally operated in a region having high efficiency, and the remaining power is charged or discharged by the motor.

To this end, an air-fuel ratio is generally controlled so that the engine lambda is 1.

However, in the related art, when the hybrid vehicle including the engine and the driving motor travels, the power of the engine and/or the driving motor is distributed within a range of physically outputtable maximum torque of the engine and maximum available torque of the driving motor, so that travelling performance in a situation requiring high torque, where the torque required by the driver is high, is not provided.

Accordingly, even though fuel efficiency deteriorates in a situation requiring high torque, because of continuous use of the accelerator by the driver, it is necessary to perform an operation where the engine lambda<1 (an operation in which a large amount of fuel is injected), in order to increase engine output to provide the torque required by the driver.

In a situation where a state of charging (SOC) of the battery is low, it is necessary to charge the battery by increasing the output of the engine, which is a power source for charging the battery even though the situation where engine lambda=1 is not maintained.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art, and to provide an apparatus and a method for controlling an engine of a hybrid vehicle, which are capable of providing the torque required by a driver and charging a battery by a driving motor by operating an engine with an engine lambda<1 when confronting a situation requiring high torque, in which the torque required by the driver is high.

In one aspect, an embodiment of the present invention provides a method for controlling an engine of a hybrid vehicle, including: calculating maximum torque of an engine, at which an engine lambda=1 is maintained; calculating maximum dischargeable torque of a driving motor; and allowing an operation of the engine having the engine lambda<1 when the torque required by a driver is larger than a sum of the maximum torque of the engine at which the engine lambda=1 is maintained and the maximum dischargeable torque of the driving motor.

In one embodiment, the maximum torque of the engine at which the engine lambda=1 is maintained may be calculated by a method of subtracting a margin for preventing knocking of the engine from a value obtained by multiplying maximum physical torque of the engine and a torque decrease factor according to atmospheric pressure.

In another embodiment, the operation of the engine having the engine lambda<1 may be allowed when the torque required by the driver is larger than a value obtained by adding a value obtained by multiplying the maximum dischargeable torque of the driving motor and a weighting factor for each state of charging (SOC) of a battery to the maximum torque of the engine at which the engine lambda=1 is maintained.

In still another embodiment, the weighting factor for each SOC of the battery is set to a smaller value in a low level region, in which the SOC of the battery is equal to or smaller than a threshold value, than that in a high level region, in which the SOC of the battery is larger than the threshold value.

In yet another embodiment, the weighting factor for each SOC of the battery may be set to a larger value in a high level region, in which the SOC of the battery is equal to or larger than a threshold value, than that in a low level region, in which the SOC of the battery is smaller than the threshold value.

In another aspect, an embodiment of the present invention provides an apparatus for controlling an engine of a hybrid vehicle, including: an engine clutch arranged between an engine and a motor and configured to transmit or block power of the engine; an automatic transmission configured to shift and output power of the engine or power of the engine and the motor to travelling wheels; an inverter configured to control the motor and control power generation; a high voltage battery connected with the inverter to be chargeable/dischargeable so that power is provided to the motor; and a control unit configured to calculate maximum torque of the engine at which an engine lambda=1 is maintained and maximum dischargeable torque of the motor, and allow an operation of the engine having the engine lambda<1 when torque required by a driver is larger than a sum of the maximum torque of the engine at which the engine lambda=1 is maintained and the maximum dischargeable torque of the motor.

Through the aforementioned technical solutions, embodiments of the present invention provide the effects below.

First, when a hybrid vehicle including an engine and a motor confronts a high torque required situation, in which torque required by a driver is high, while travelling, the engine may be operated with an engine lambda<1, thereby satisfying the torque required by the driver by increasing an output of the engine.

Second, at a low level of an SOC of a battery, an engine may be operated with an engine lambda<1 and a driving motor maybe utilized as power generating power for charging a battery, thereby satisfying SOC balancing of the battery.

Third, at a high level of the SOC of the battery, even when torque required by a driver is large, the operation of the engine with the engine lambda=1 may be induced by setting a weighting factor for each SOC of the battery to be large, thereby promoting an improvement of fuel efficiency.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the inventive concept are discussed infra.

BRIEF DESCRIPTION OF THE DRAWINGS

The above and other features of the present inventive concept will now be described in detail with reference to certain exemplary embodiments thereof illustrated in the accompanying drawings which are given hereinbelow by way of illustration only, and thus are not limitative of the present invention, and wherein.

Figure 1:
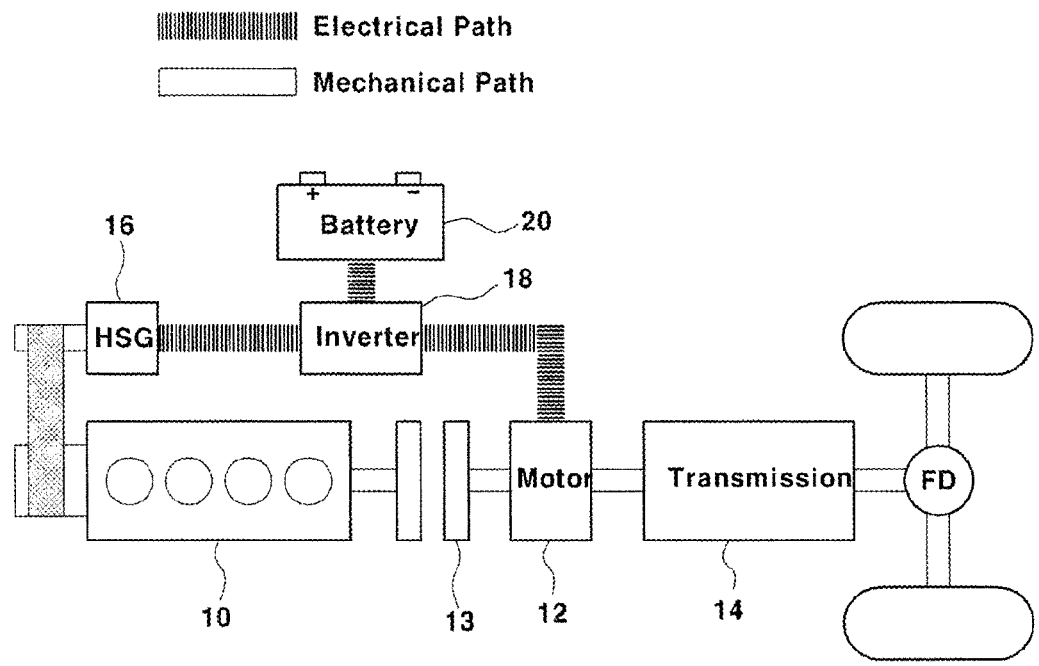
FIG. 1 is a configuration diagram illustrating a power train system for a hybrid vehicle.

It should be understood that the appended drawings are not necessarily to scale, presenting a somewhat simplified representation of various preferred features illustrative of the basic principles of the inventive concept. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the inventive concept will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Referring to FIG. 1, a power train system for a hybrid vehicle includes an engine 10 and a motor 12 serially arranged with each other, an engine clutch 13 arranged between the engine 10 and the motor 12 to transmit or block power from the engine, an automatic transmission 14 shifting and outputting power from the motor and the engine to the wheels, a hybrid starter generator (HSG) 16, a motor connected with a crank pulley of the engine to transmit power for starting the engine and charging the battery, an inverter 18 controlling the motor and controlling power generation, and a high voltage battery 20 connected with the inverter so as to be chargeable/dischargeable, so that power is provided to the motor 12 and the like.

An apparatus for controlling an engine for a hybrid vehicle of the present inventive concept controls the power train system for the hybrid vehicle configured as described above, and when the apparatus confronts a situation requiring high torque, in which torque required by a driver is high, the apparatus controls the engine to be operated with the engine lambda<1, thereby providing the torque required by the driver and charging the battery by the driving motor.

To this end, the apparatus for controlling an engine for a hybrid vehicle of the present inventive concept includes a control unit, which sets (calculates) a maximum torque region of the engine, in which engine lambda is maintained at 1. The control unit also sets a value obtained by adding the maximum available torque of the driving motor to the calculated maximum torque of the engine as a reference value, and allows the engine to be controlled in a region in which the engine lambda<1 when the torque required by the driver exceeds the reference value, thereby providing the torque required by the driver by increasing the output of the engine, and satisfying a state of charging (SOC) balancing of the battery.

For reference, the engine lambda refers to the ratio of the actual air-fuel ratio to the theoretical air-fuel ratio (actual intake air quantity/theoretically required air quantity) and is indicated by a symbol $\lambda$ (lambda). When engine lambda ($\lambda$)>1.0 refers to a lean mixture, and when engine lambda ($\lambda$)<1.0 refers to a rich mixture. The output of the engine is maximum in the rich mixture (where engine lambda ($\lambda$) is less than 1.0 ($\lambda$<1.0)), but a large amount of carbon monoxide (CO) and hydrocarbon (HC) may be discharged. In contrast, fuel efficiency is excellent in the lean mixture (where engine lambda (λ) is greater than 1.0 (λ>1.0)), but the engine output is decreased, so that the engine air-fuel ratio is controlled to be at a level of the lambda (λ)=1 as a compromise point.

Here, a method of controlling an engine of a hybrid vehicle according to the present inventive concept will be described in detail below.

Figure 2:
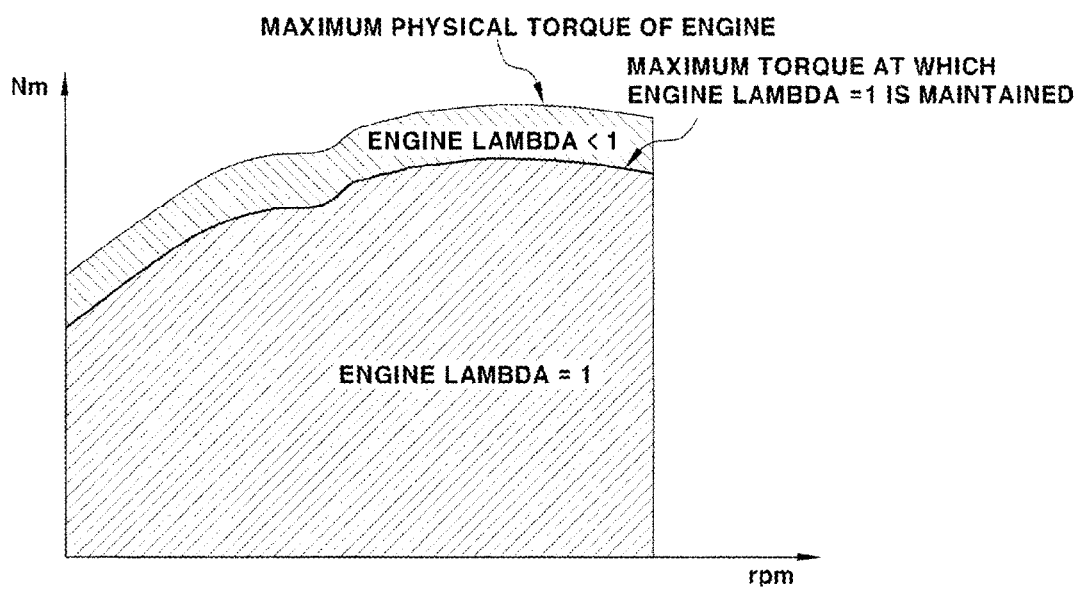
FIG. 2 is a graph illustrating a torque change according to engine lambda of a hybrid vehicle.
Figure 3:
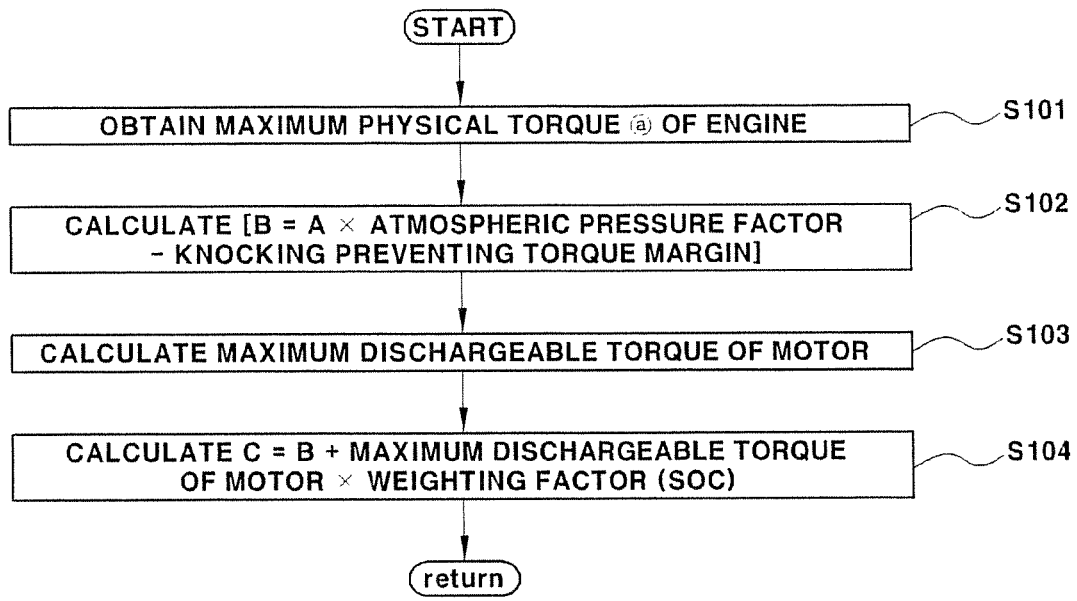
FIGS. 3 and 4 are flowcharts illustrating a method of controlling an engine of a hybrid vehicle according to embodiments of the present invention.
Figure 4:
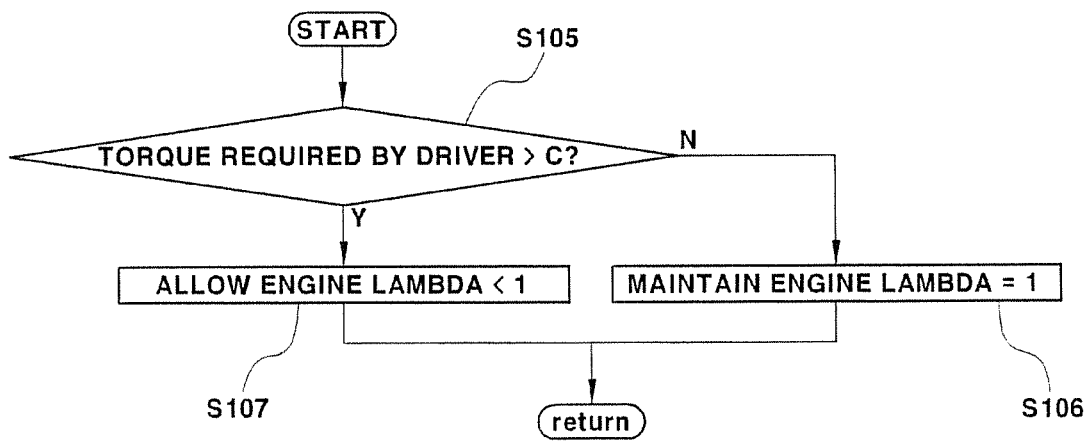

FIG. 2 is a graph illustrating a change in torque according to engine lambda of the hybrid vehicle, and FIGS. 3 and 4 are flowcharts illustrating a method of controlling an engine of a hybrid vehicle according to the present inventive concept.

First, in order to control the engine of the power train system for the hybrid vehicle illustrated in FIG. 1, the control unit preliminarily calculates the maximum torque of the engine at which engine lambda=1 may be maintained.

To this end, in order to calculate the maximum torque of the engine at which engine lambda=1 may be maintained, the control unit obtains maximum physical torque ⓐ of the engine mounted in the corresponding kind of vehicle (S101).

The maximum physical torque of the engine ⓐ is obtained by obtaining maximum torque data for each RPM of the engine in a test stage of a corresponding engine.

Next, maximum torque b of the engine is calculated. Maximum torque b refers to the maximum torque at which the engine lambda=1 may be maintained by applying an atmospheric pressure factor to the obtained maximum physical torque of the engine ⓐ and subtracting a margin for preventing engine knocking.

In this case, the maximum torque b of the engine, at which the engine lambda=1 may be maintained, that is, the maximum torque b of the engine controllable in a state where the engine lambda=1, may be set considering an intake air temperature, atmospheric pressure, and engine knocking generation, and the like.

Accordingly, the maximum torque b of the engine, at which the engine lambda=1 may be maintained, is calculated by a method of subtracting a margin (physical margin) for preventing engine knocking from a value obtained by multiplying the maximum physical torque ⓐ of the engine and a torque decrease factor according to atmospheric pressure (S102).

The torque decrease factor according to the atmospheric pressure is increased when atmospheric pressure is high (at sea level altitude is low). When the vehicle ascends to a high place, the torque of the engine approaches the maximum torque, at which engine lambda=1 may be maintained, so that when the vehicle ascends to a higher place, available engine torque range is decreased.

Next, the control unit calculates maximum dischargeable torque of the driving motor, that is, the maximum dischargeable torque of the motor (S103).

The maximum dischargeable torque of the driving motor is calculated considering maximum discharging power of the battery and maximum dischargeable torque of the motor system, and may be obtained from map data, in which the calculated result is databased.

Next, the control unit calculates a control value c capable of allowing engine lambda<1.

The control value c capable of allowing the engine lambda<1 may be calculated by adding the maximum dischargeable torque of the driving motor to the maximum torque b of the engine at which the engine lambda=1 may be maintained. The control value c may also be calculated by adding a value obtained by multiplying the maximum dischargeable torque of the driving motor by a weighting factor for each SOC of the battery to the maximum torque b of the engine at which the engine lambda=1 may be maintained (S104).

The calculated control value c capable of allowing the engine lambda<1 is compared with the torque required by the driver to determine engine lambda (S105).

When the torque required by the driver determined according to stepping of an accelerator pedal by the driver is less than the control value c capable of allowing the engine lambda<1, the torque required by the driver is not high required torque, so that the engine is continuously controlled to remain at the engine lambda=1 (S106).

By contrast, when the torque required by the driver determined according to the use of the accelerator pedal by the driver is larger than the control value c capable of allowing the engine lambda<1, for example, when the torque required by the driver is larger than a value obtained by adding a value obtained by multiplying the maximum dischargeable torque of the driving motor by a weighting factor for each SOC of the battery to the maximum torque b of the engine at which the engine lambda=1 may be maintained, the required torque is high required torque, so that a control allowing the engine to be operated at the engine lambda<1 capable of increasing an output of the engine is performed (S107).

When the SOC of the battery has a low level equal to or smaller than a threshold value, the weighting factor for each SOC of the battery is set to a value smaller than a value applied when the SOC of the battery has a high level larger than the threshold value, so that the operation of the engine having the engine lambda<1 is allowed, and a charging of the battery by the driving motor is induced.

When the SOC of the battery is at a low level, the weighting factor for each SOC of the battery is set to a small value. Thus, the value c obtained by adding the value obtained by multiplying the maximum dischargeable torque of the driving motor by the weighting factor for each SOC of the battery to the maximum torque b of the engine at which the engine lambda=1 may be maintained, is decreased. Accordingly, when the torque required by the driver is larger than the control value c capable of allowing the engine lambda<1 at a low level of the SOC of the battery, at which the SOC of the battery is equal to or smaller than the threshold value, at which the weighting factor for each SOC of the battery is set to a small value, it is possible to more easily increase a torque output of the engine by allowing the operation of the engine having the engine lambda<1. In this case, the hybrid vehicle may travel only with the power of the engine operated with the engine lambda<1.

When the hybrid vehicle travels only with the power of the engine operated with the engine lambda<1, the driving motor is separately driven to be utilized as a generating power for charging the battery, so that it is possible to easily charge the battery having the SOC having a value equal to or smaller than the threshold value.

By contrast, when the SOC of the battery has a high level equal to or larger than the threshold value, the weighting factor for each SOC of the battery is set to a larger value than the value applied to the low level of the SOC of the battery which is equal to or smaller than the threshold value, so that the operation of the engine having the engine lambda=1 is induced.

The weighting factor for each SOC of the battery is set to a large value at a high level of the SOC of the battery. Thus, the value obtained by adding the value obtained by multiplying the maximum dischargeable torque of the driving motor by the weighting factor for each SOC of the battery to the maximum torque b of the engine, at which an engine lambda=1 may be maintained, is increased. That is, the control value c capable of allowing engine lambda compared to the torque required by the driver <1, is increased.

Accordingly, the weighting factor for each SOC of the battery is set to a large value at the high level of the SOC of the battery, so that the control value c capable of allowing the engine lambda<1 is in an increased state, so that the torque required by the driver does not exceed the control value c capable of allowing the engine lambda<1. Thus, it is possible to induce the engine to be operated with the engine lambda=1, thereby promoting an improvement in fuel efficiency.

As described above, when the hybrid vehicle confronts a situation requiring high torque, in which the torque required by the driver is large, while the hybrid vehicle including the engine and the motor travels, the engine is operated with the engine lambda<1, so that it is possible to provide the torque required by the driver by increasing the output of the engine, and the driving motor is utilized as generating power for charging the battery, thereby satisfying SOC balancing of the battery.

At the high level of the SOC of the battery, even when the torque required by the driver is large, the operation of the engine having the engine lambda=1 is induced by setting the weighting factor for each SOC of the battery to be large, thereby promoting an improvement in fuel efficiency.

The inventive concept has been described in detail with reference to various embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling an engine of a hybrid vehicle, comprising steps of:
   calculating a maximum torque of an engine at which an engine lambda equal to 1 is maintained;
   calculating a maximum dischargeable torque of a driving motor; and
   allowing an operation of the engine having an engine lambda less than 1 when a torque required by a driver is greater than a sum of the maximum torque of the engine at which the engine lambda equal to 1 is maintained and the maximum dischargeable torque of the driving motor,
   wherein the operation of the engine having the engine lambda less than 1 is allowed when the torque required by the driver is larger than a value obtained by adding a value obtained by multiplying the maximum dischargeable torque of the driving motor and a weighting factor for each state of charging (SOC) of a battery to the maximum torque of the engine at which the engine lambda equal to 1 is maintained,
   wherein the weighting factor for each SOC of the battery is set to a smaller value in a low level region, in which the SOC of the battery is equal to or smaller than a threshold value, than that in a high level region, in which the SOC of the battery is larger than the threshold value, such that the engine operates with the engine lambda less than 1 and at the same time the battery is charged by means of driving the motor.

2. The method of claim 1, wherein the maximum torque of the engine at which the engine lambda equal to 1 is maintained is calculated by a method of subtracting a margin for preventing knocking of the engine from a value obtained by multiplying a maximum physical torque of the engine and a torque decrease factor according to atmospheric pressure.

3. The method of claim 1, wherein the weighting factor for each SOC of the battery is set to a larger value in a high level region, in which the SOC of the battery is equal to or larger than a threshold value, than that in a low level region, in which the SOC of the battery is smaller than the threshold value.

4. An apparatus for controlling an engine of a hybrid vehicle, comprising:
   an engine clutch arranged between an engine and a motor and configured to transmit or block power of the engine;
   an automatic transmission configured to shift and output power of the engine or power of the engine and the motor to the wheels;
   an inverter configured to control the motor and to control power generation;
   a high voltage battery connected to the inverter and configured to be chargeable and dischargeable so that power is provided to the motor; and
   a control unit configured to calculate a maximum torque of the engine at which an engine lambda equal to 1 is maintained and a maximum dischargeable torque of the motor, and allow an operation of the engine having an engine lambda less than 1 when a torque required by a driver is larger than a sum of the maximum torque of the engine at which the engine lambda equal to 1 is maintained and the maximum dischargeable torque of the motor,
   wherein the control unit allows the operation of the engine having the engine lambda less than 1 when the torque required by the driver is larger than a value obtained by adding a value obtained by multiplying the maximum dischargeable torque of the driving motor and a weighting factor for each state of charging (SOC) of a battery to the calculated maximum torque of the engine at which the engine lambda equal to 1 is maintained,
   wherein the weighting factor for each SOC of the battery is set to a smaller value in a low level region where the SOC of the battery is equal to or smaller than a threshold value than that in a high level region where the SOC of the battery is larger than the threshold value, such that the engine operates with the engine lambda less than 1 and at the same time the battery is charged by means of driving the motor.

5. The apparatus of claim 4, wherein the maximum torque of the engine at which the engine lambda equal to 1 is maintained is calculated by a method of subtracting a margin for preventing knocking of the engine from a value obtained by multiplying a maximum physical torque of the engine and a torque decrease factor according to atmospheric pressure.

6. The apparatus of claim 4, wherein the weighting factor for each SOC of the battery is set to a larger value in a high level region, in which the SOC of the battery is equal to or larger than a threshold value, than that in a low level region, in which the SOC of the battery is smaller than the threshold value.

* * * * *